(12) United States Patent
Greene et al.

(10) Patent No.: US 10,627,570 B2
(45) Date of Patent: Apr. 21, 2020

(54) FIBER PANEL INCLUDING NONCIRCULAR OPTICAL FIBERS

(71) Applicant: Valeo North America, Inc., Troy, MI (US)

(72) Inventors: Kayla Greene, Seymour, IN (US); John Orisich, Seymour, IN (US); Shivi Singh, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/864,524

(22) Filed: Jan. 8, 2018

(65) Prior Publication Data

US 2019/0212491 A1 Jul. 11, 2019

(51) Int. Cl.
| | |
|---|---|
| *G02B 6/08* | (2006.01) |
| *G02B 6/02* | (2006.01) |
| *F21S 41/24* | (2018.01) |
| *F21V 8/00* | (2006.01) |
| *B60Q 1/00* | (2006.01) |

(52) U.S. Cl.
CPC ............. *G02B 6/08* (2013.01); *B60Q 1/0011* (2013.01); *F21S 41/24* (2018.01); *G02B 6/0006* (2013.01); *G02B 6/02371* (2013.01); *C03B 2203/302* (2013.01); *G02B 6/001* (2013.01)

(58) Field of Classification Search
CPC .............. G02B 6/06; G02B 6/04; G02B 6/08
See application file for complete search history.

(56) References Cited

U.S. PATENT DOCUMENTS

| | | | |
|---|---|---|---|
| 2,992,956 A * | 7/1961 | Bazinet, Jr. | C03B 37/15 156/296 |
| 4,166,668 A | 9/1979 | Macleod | |
| 4,885,663 A | 12/1989 | Parker | |
| 5,892,436 A * | 4/1999 | Blackburn | A44B 11/2565 180/268 |
| 7,556,412 B2 | 7/2009 | Guillermo | |
| 8,529,804 B2 | 9/2013 | Deng et al. | |
| 2007/0161337 A1* | 7/2007 | Larson | B24B 19/11 451/41 |
| 2007/0189031 A1* | 8/2007 | Delmar | G02B 6/0008 362/556 |

* cited by examiner

*Primary Examiner* — Sung H Pak
*Assistant Examiner* — Hoang Q Tran
(74) *Attorney, Agent, or Firm* — Oblon, McClelland, Maier & Neustadt, L.L.P.

(57) ABSTRACT

A fiber panel, a light module, and a method for transmitting light using the fiber panel are provided. The fiber panel includes a plurality of optical fibers; and wherein each of the optical fibers have at least one base surface, and the fibers being arranged such that the at least one base surface of each optical fiber have a common orientation with each other.

14 Claims, 5 Drawing Sheets

FIBER PANEL INCLUDING NONCIRCULAR OPTICAL FIBERS

BACKGROUND

As is well known, vehicles contain numerous types of lighting devices. For example, exterior vehicle lighting devices that perform a stop light function, tail lamp function, head lamp function, daytime running light function, dynamic bending light function, and fog light function are common.

Vehicle manufacturers have made an effort to design vehicle lighting devices in consideration of the styling of a vehicle on which the lighting devices are mounted. Further, vehicle manufacturers may provide optional lighting effects (in addition to the required lighting functionality) to enhance vehicle styling.

In recent years some vehicle manufacturers are utilizing organic light-emitting diodes (OLED) in an effort to meet desired lighting and aesthetic characteristics of vehicle lighting. OLED devices generally take the form of very thin panels that can be formed into three-dimensional shapes. Fiber panel LEDs may have a similar panel form to OLEDs. Fiber panels may include multiple optical fibers having a circular cross section.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

An aspect of the present disclosure includes a fiber panel. The fiber panel includes a plurality of optical fibers. Each of the optical fibers has at least one base surface. The fibers are arranged such that the at least one base surface of each optical fiber have a common orientation with each other.

In one embodiment, the at least one base surface includes a flat section.

In one embodiment, each optical fiber has a polygonal cross section.

In one embodiment, each optical fiber has a hexagonal cross section.

In one embodiment, each optical fiber has a triangular cross section.

In one embodiment, the plurality of optical fibers are arranged in a honeycomb fashion.

In one embodiment, abraded sides of each optical fiber have the same orientation with each other.

A further aspect of the present disclosure includes a light module. The light module includes a light source configured to generate a light; and a fiber panel optically coupled to the light source. The fiber panel includes a plurality of optical fibers in which each of the optical fibers has at least one base surface, and the plurality of optical fibers are arranged such that the at least one base surface of each optical fiber have a common orientation with each other.

A further aspect of the present disclosure includes a method for transmitting light using a fiber panel. The method includes arranging a plurality of optical fibers to define an illumination region and coupling light from a light source to the plurality of optical fibers. Each of the optical fibers have at least one base surface, and the fibers are arranged such that the at least one base surface of each optical fiber have a common orientation with each other.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
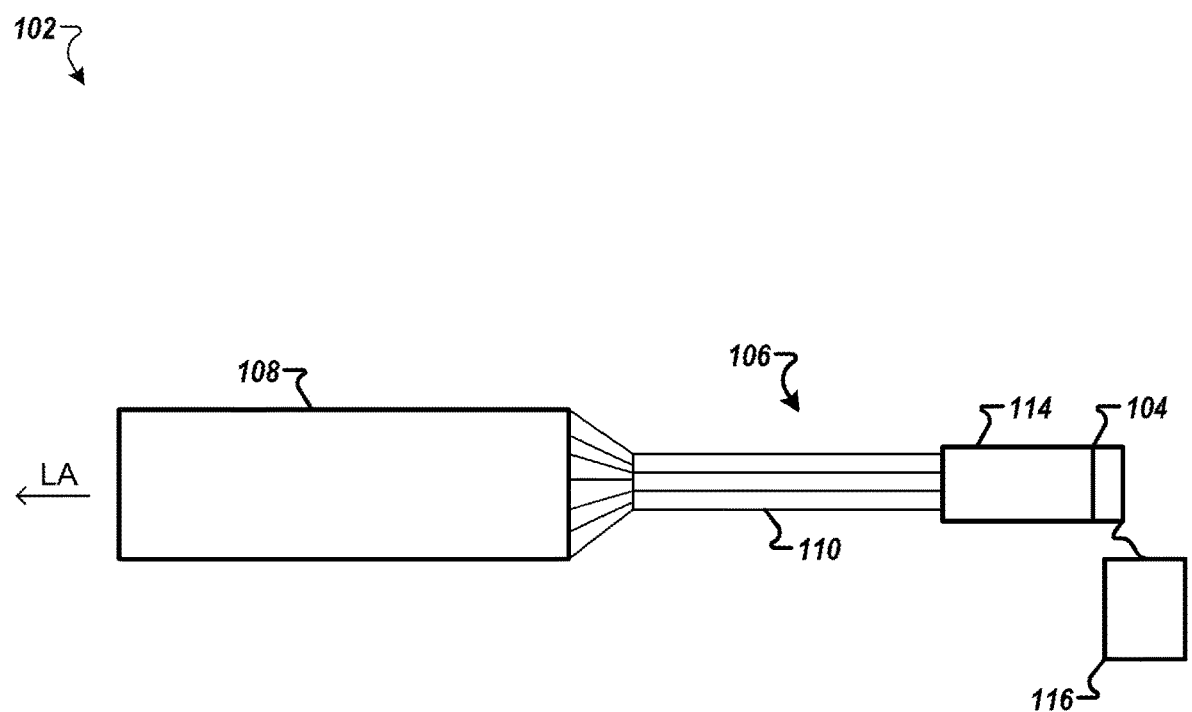
FIG. 1 is a schematic view of a fiber optic light panel device according to one example.

Referring now to the drawings, wherein like reference numerals designate identical or corresponding parts throughout several views, the following description relates to a fiber panel that includes noncircular optical fibers.

Optical fibers are used to transmit light from one end of a fiber to the other end. This mode of operation based on total internal reflection (TIR) is used for lighting. Optical fibers may also be treated to emit light from the surface of the fibers. The alteration of optical fibers for the purpose of surface emission may involve grinding or abrading the surface of the fibers to produce regular or random surface features that allow some of the transmitted light to escape from the core of the optical fibers.

Fiber panel modules generally include a controller, a coupler, an optical fiber bundle, and a fiber panel (i.e., emitting panel). The fiber panel modules also include a light source that inputs light to the optical fiber bundle having fibers extending therefrom to form the fiber panel. Fiber panels that include optical fibers having a circular cross sectional shape may have several drawbacks such as being unable to be packaged in such a way that all air bubbles are removed. In addition, it may be difficult to put a precisely defined abrasion pattern on the fiber panel.

The fiber panel described herein is formed using noncircular optical fibers (i.e., optical fibers that have a noncircular cross section). By using the optical fibers described herein, the fiber panels may be able to be assembled more uniformly and repeatedly. The optical fibers described herein also provide the advantage of the ability to achieve more precise abrasions which may result in a uniform light output from the fiber panel.

FIG. 1 is a schematic view of a fiber optic light panel device 102 according to one example. The fiber optic light panel device 102 includes a light source 104, a fiber bundle 106, and a fiber panel 108. The fiber panel 108 may include a backing and a cover layer.

The fiber bundle 106 may include a large number of glass or plastic optical fibers 110 that can be bound together at one end by bundling element 114. For example, the fiber bundle 106 may include a large number of abraded PMMA (Polymethyl methacrylate) fibers. The bundling element 114 may be formed from a brass or plastic ferrule, cable tie, tape, adhesive, or other material that can hold the fiber bundle 106 in a predetermined shape. Additional bundling elements may be used. The light generated by the light source 104 may be coupled to the fiber bundle 106 for transmission to the fiber panel 108. In the drawings, only a small number of optical fibers 110 is shown for simplicity. In one example, the fiber bundle 106 may be coupled to the light source 104 via an optical fiber coupler (not shown). Further, the light source 104 may include a heat sink (not shown).

The fiber bundle 106 described herein may include from several tens of fibers to thousands of fibers. All or a part of the optical fibers 110 may be extended therefrom to form one or more fiber panels 108. In one implementation, the fiber bundle 106 may include approximately between 250 and 350 fibers.

Light source 104 may include one or more light emitting devices or solid state light sources. The term "solid state" generally refers to light emitted by solid-state electroluminescence, as distinct from light emitted by a source of incandescence or fluorescence. For example, light source 104 may include an inorganic semiconductor light emitting diode (LED) or laser diode, an organic light emitting diode (OLED), a polymer light emitting diode (PLED), an LED lamp package, a LED chip or LED die, or an array of one or more of these devices. When a plurality of devices of LEDs is used, the LEDs may have the same or different colors. The light source 104 may be an LED, multiple discrete LEDs, or an LED light bar. In one example, the light source 104 may be an LED providing approximately 2 W, 140 lm output at 2.65 Volts and 750 mA of current. The light source 104 may be controlled using a controller 116.

Optical fibers 110 can be arranged in a generally parallel relationship with respect to one another, parallel with longitudinal axis LA of the fiber panel 108. However, it should be understood that optical fibers 110 may assume similar or different positions (e.g., parallel, non-parallel, curved, accurate or serpentine). Optical fibers 110 may have different sizes or dimensions, such as different parameters.

Figure 2A:
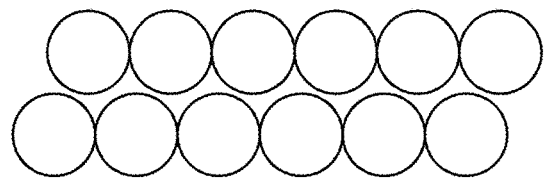
FIGS. 2A-2G show cross-sectional views of a fiber panel according to one example.

FIG. 2A shows a cross-section of a conventional fiber panel having two layers of optical fibers. As described previously herein, the circular optical fibers may not be easily arranged and air gaps between the optical fibers may not be mitigated.

The optical fibers 110 have a noncircular shape. Each optical fiber of the fiber panel 108 has a base surface 202 (i.e., base side). The base surface 202 may contact another surface by at least two spaced apart contact surfaces. The base surface 202 may include multiple sections. At least one section of the multiple sections has a noncircular shape. In one configuration, the base surface 202 may be flat. The optical fibers are arranged such that the base surface 202 of each optical fiber 110 has a common orientation with other base surfaces of the other optical fibers. For example, the optical fibers 110 may be arranged in a honeycomb configuration to form multiple layers.

In one implementation, all sides of the optical fiber 110 may have a shape similar to the base surface 202. For example, the optical fiber 110 may have a polygonal shape. In one example, the optical fibers may have a convex polygonal shape such as a triangular shape, a square shape, a pentagonal shape, a hexagonal shape, a heptagonal shape, an octagonal shape, a nonagonal shape, a decagonal shape, a trapezoid shape, a parallelogram shape, and the like. Further, the polygonal shape may be regular such as an equilateral triangle as shown in FIG. 2C.

Figure 2B:
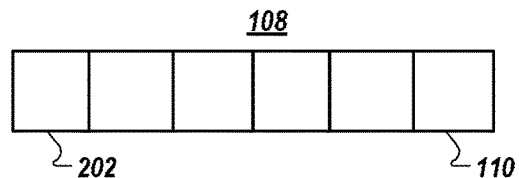

In one configuration, the optical fiber 110 may have a square shape. The cross-section of the fiber panel formed using square optical fibers is shown in FIG. 2B. Each side may be of 0.23 mm. The cross section of the fiber can range from 250 μm to 3000 μm.

Figure 2C:
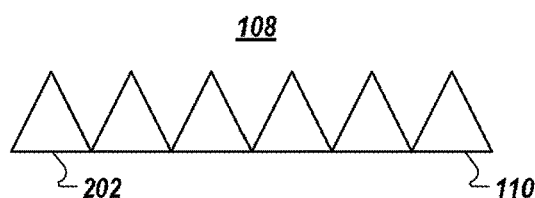

The optical fiber 110 may have a triangular cross-section as shown in FIG. 2C. The triangular may be isosceles. The optical fiber 110 may be arranged such as the base surface 202 of each optical fiber 110 is parallel to a top surface of the fiber panel 108.

Figure 2D:
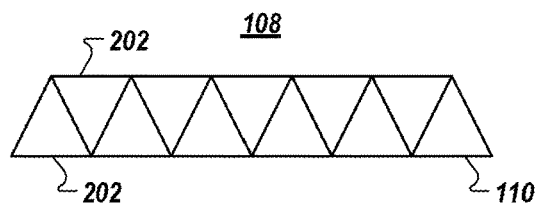

The optical fibers 110 having a triangular cross-section may be arranged in two or more layers to form the fiber panel 108. FIG. 2D shows optical fibers arranged in two layers. The base surface 202 of each of the optical fibers in the two layers are arranged parallel to the top surface of the fiber panel 108. The optical fibers in a second layer may be arranged in an opposite direction (i.e., upside-down with respect to the optical fibers in the first layer) such as to complement the first layer and minimize air gaps between the optical fibers.

Figure 2E:
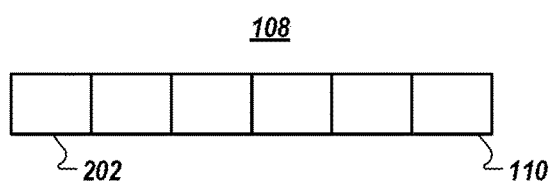

In one implementation, the optical fiber 110 may have a rectangular cross-section as shown in FIG. 2E. Square and rectangular shaped-optical fibers can help in better packing and in achieving different looks. In addition, square and rectangular shaped-optical fiber have difference in performance.

Figure 2F:
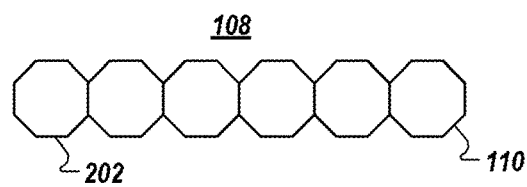

The optical fiber 110 may have an octagonal cross-section as shown in FIG. 2F. In one configuration, the octagonal optical fibers are arranged such that each side of the optical fiber 110 has a common orientation with a corresponding side of the other optical fibers.

Figure 2G:
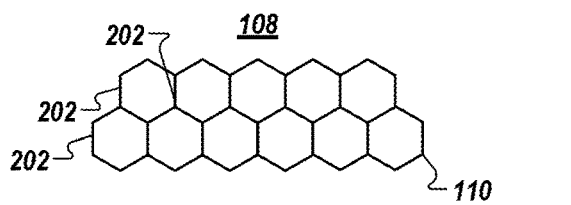

FIG. 2G shows a cross-sectional of the fiber panel 108 according to one example. The optical fiber 110 may have a hexagonal shape. The optical fibers may be arranged in multiple layers in a honeycomb fashion which results in a maximum packing density. The optimized shapes and arrangements provide a uniform panel and better efficiency compared to fiber panels formed using circular optical fibers.

Figure 3A:
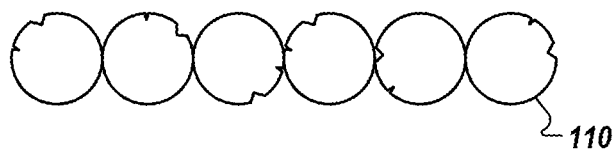
FIGS. 3A-3D are schematics that show cross-sectional views of abraded fiber panels according to one example.

The utilization of noncircular optical fibers may allow for additional methods of abrasion. Current techniques are purely mechanical and only accomplish an overall effect. By aligning the optical fibers described herein together, it is possible to use laser ablation techniques to create very finely controlled patterns on the fibers. Abrasion patterns and their orientations can be easily controlled by using the fiber shapes described herein. FIG. 3A shows a cross section of a conventional abraded fiber panel. As shown in FIG. 3A, abrasions may be random as the optical fibers may rotate during the assembly of the fiber panel. For example, after abrading the optical fibers and before gluing the optical fibers together to form the fiber panel the optical fibers may shift. The randomness in the orientation of the abraded optical fiber may increase light loss and minimize light output from the emitting side of the fiber panel.

Figure 3B:
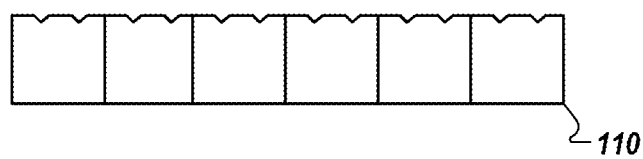
Figure 3C:
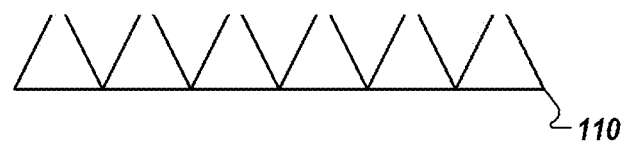
Figure 3D:
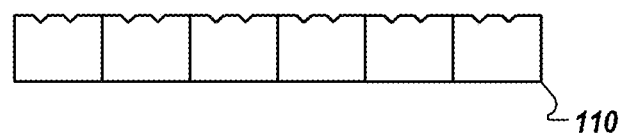

FIGS. 3B-3D show exemplary cross-sectional views of abraded fiber panels 108. As shown in FIGS. 3B-3D, the optical fibers 110 may be arranged and abraded. The abrasions may be periodical and have a predetermined pattern. The light output from the fiber panel 108 is maximized.

Fine optics may be created on the surface of the optical fibers described herein using laser ablation. The optics may be configured to diffuse, focus, or direct the light. For example, inclusions such as found in a brightness enhancement film (BEF) may be added onto the optical fibers. The characteristics of the inclusions may be manipulated to provide a range of reflective and transmissive properties of the optical fiber 110. For example, the optical fiber 110 may include an array of cavities having sizes and distributions determined based on the application.

Figure 4:
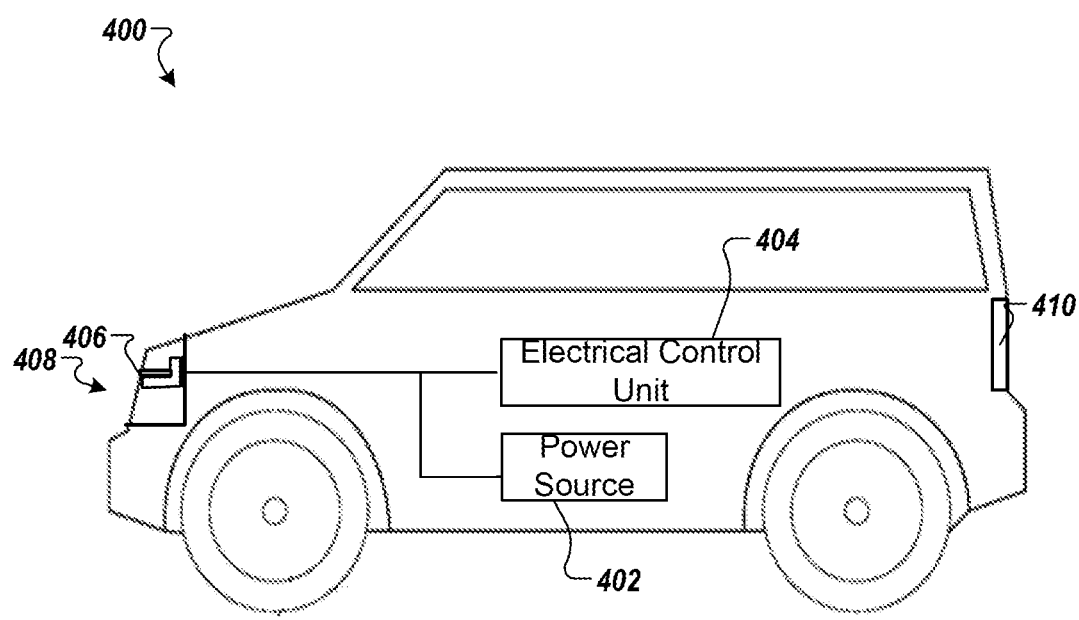
FIG. 4 is a schematic that shows a side view of a motor vehicle according to one example.

FIG. 4 is a schematic that shows a side view of a motor vehicle 400 according to one example. The motor vehicle 400 may include a power source 402 and an electrical control unit 404. FIG. 4 shows a headlamp assembly 406, a front lamp assembly 408, and a rear lamp assembly 410. The front lamp assembly 408 can be separate from the headlamp assembly 406 or can be incorporated into the same assembly module. The rear lamp assembly 410 represents signaling functions, such as a combination brake lamp and tail lamp or a combination tail lamp and a turn signal lamp.

Figure 5:
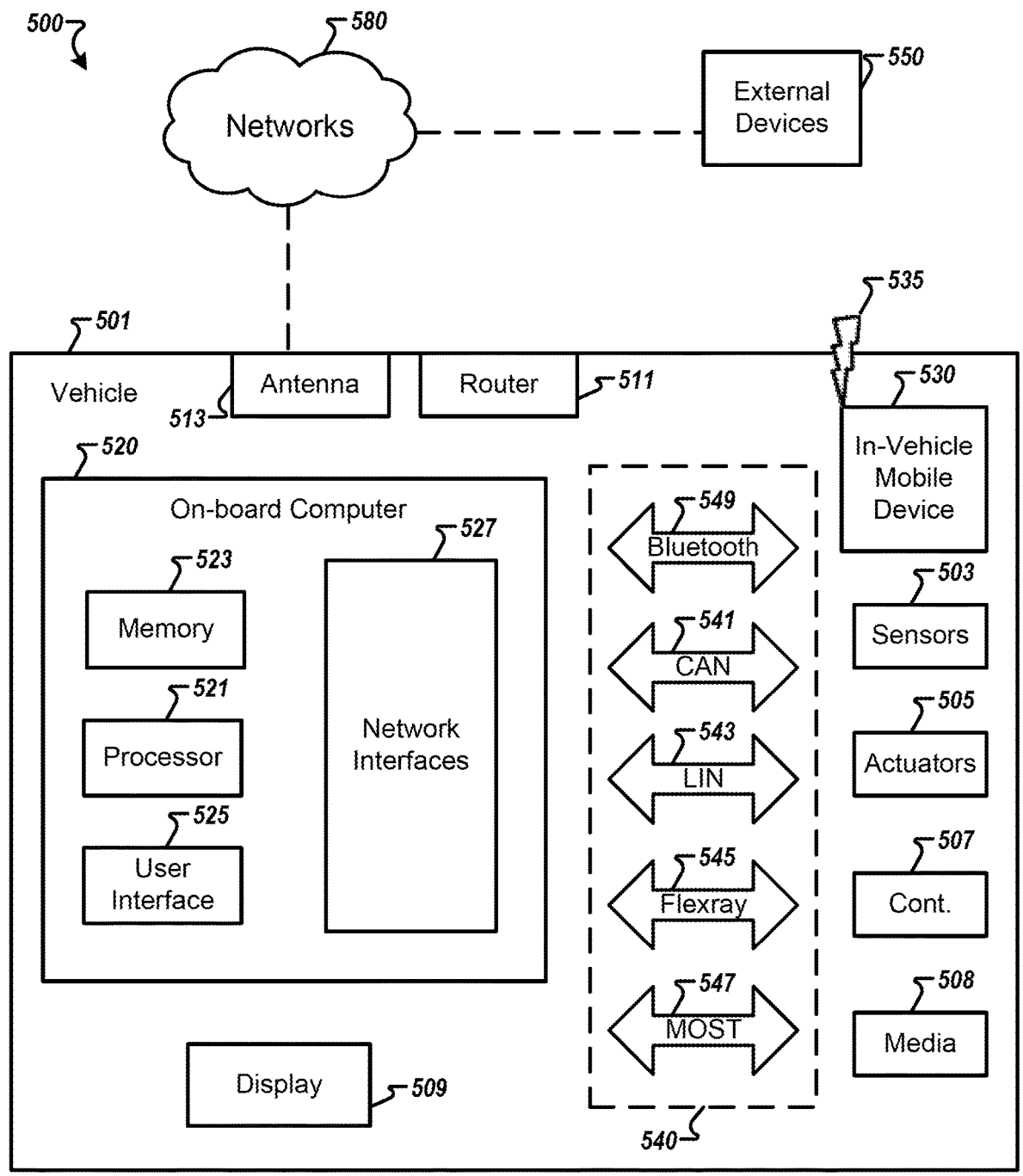
FIG. 5 is a simplified block diagram of a vehicle environment in which embodiments of the invention disclosed herein may be implemented.

FIG. 5 is a simplified block diagram of a vehicle environment 500 in which embodiments of the invention disclosed herein may be implemented. The vehicle environment 500 includes a vehicle 501 in communication with one or more external devices 550 by way of one or more external networks 580. Vehicle 501 also includes various internal networks 540 for interconnecting several vehicle devices within the vehicle as will be discussed below. The vehicle environment 500 may also include one or more in-vehicle mobile device 530. External devices 550 include any device located outside the vehicle 501 such that the external device must communicate with the vehicle and its devices by an external network 580. For example, the external devices may include mobile devices, electronic devices in networked systems (e.g., servers or clients in a local area network (LAN), etc.), on board computers of other vehicles etc. In-vehicle mobile devices 530 are devices which are located within, or in the vicinity of the vehicle 501 such that the in-vehicle mobile device can communicate directly with internal networks 540 of the vehicle 501. In-vehicle mobile devices 530 may also connect with external networks 580.

Vehicle 501 includes vehicle devices integral with or otherwise associated with the vehicle 501. In the embodiment of FIG. 5, vehicle devices include one or more sensors 503, one or more actuators 505, one or more control units 507, one or more media systems 508, one or more displays 509, one or more routers 511, one or more antenna 513, and one or more on board computers 520. The one or more on board computers may generate signals having a desired duty factor to control one or more vehicle lights such as the light source 104. As used herein, the term "vehicle device" is meant to encompass sensors, actuators, controllers, electronic control units (ECUs), detectors, instruments, embedded devices, media devices including speakers, a CD and/or DVD player, a radio, vehicle navigation systems (e.g., GPS) displays, other peripheral or auxiliary devices or components associated with the vehicle 501.

Sensors 503 detect various conditions within (or in the immediate vicinity of) the vehicle 501. For example, sensors 503 may be temperature sensors, photosensors, position sensors, speed sensors, angle sensors or any other sensor for detecting a diagnostic condition or other parameter of the vehicle 501 or its ambient environment. Sensors 503 may be passive or "dumb" sensors that provide an analog representative of the sensed parameter, or so called "smart" sensors with integrated memory and digital processing capability to analyze the parameter sensed within the sensor itself. Actuators 505 cause motion of some mechanical element of the vehicle in response to a control signal. For example, actuators 505 may be hydraulic actuators, pneumatic actuators or electrical/electronic actuators such as a stepper motor. Actuators 505 may be used to move vehicle lighting devices to implement intelligent light, for example. Actuators 505 may be used to move the fiber optic light panel device 102.

Actuators 505 may also be "dumb" devices that react to a simple analog voltage input, or "smart" devices with built-in memory and processing capability. Actuators 505 may be activated based on a sensed parameter from sensors 503, and one such sensed parameter may be a physical position of the actuator 503 itself. Thus, the sensors 503 and actuators 505 may be connected in a feedback control loop for diagnostic detection and control of the vehicle 501.

On-board computer 520 is a vehicle device for providing general purpose computing functionality within the vehicle 501. The on-board computer 520 typically handles computationally intensive functions based on software applications or "apps" loaded into memory. On-board computer 520 may also provide a common interface for different communication networks in the vehicle environment 500. On-board computer 520 includes one or more processor 521, one or more memory 523, one or more user interface 525 (e.g., the operator interface described previously herein), and one or more network interface 527.

In example embodiments, the operations for controlling the light source 104 may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.).

Multiple internal vehicle networks represented by 540 may exist in the vehicle 501 to provide communication pathways to various vehicle devices distributed throughout the vehicle 501. An internal vehicle network 540 is a collection of nodes, such as vehicle devices, integrated with or otherwise linked to the vehicle and interconnected by communication means. Vehicle networks 540 typically include hard wired bus type networks, each providing communication pathways to particular vehicle devices distributed throughout a vehicle. FIG. 5 shows four examples of such hard wired networks: Controller Area Network (CAN) 541, Local Internet Network (LIN) 543, Flexray bus 545, and Media Oriented System Transport (MOST) network 547.

Other hard wired internal networks such as Ethernet may be used to interconnect vehicle devices in the vehicle 501. Further, internal wireless networks 549, such as near field communications, Bluetooth, etc. may interconnect vehicle devices.

Users (driver or passenger) may initiate communication in vehicle environment 500 via some network, and such communication may be initiated through any suitable device such as, in-vehicle mobile device 530, display 509, user interface 525, or external devices 550, for example to activate the fiber optic light panel device 102.

A system which includes the features in the foregoing description provides numerous advantages to users. In particular, using noncircular optical fibers to form the fiber panel help to prevent air gaps and bubbles in the final panel assembly.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A fiber panel comprising:
a plurality of optical fibers; and
wherein each of the optical fibers have at least one noncircular side, and the optical fibers being arranged such that the at least one noncircular side of each optical fiber have a common orientation with each other to form the fiber panel, each of the optical fibers having a same periodical pattern of abrasions on a side other than the input and output end sides, the fiber panel being configured to output light from at least one emitting side corresponding to abraded sides of the optical fibers, the fiber panel being included in an automotive light module, each of the optical fibers being formed by a laser technique, and the periodical pattern being obtained by laser ablation.

2. The fiber panel of claim 1, wherein a cross section of the at least one noncircular side includes a flat section.

3. The fiber panel of claim 2, wherein each optical fiber has a polygonal cross section.

4. The fiber panel of claim 3, wherein each optical fiber has a hexagonal cross section.

5. The fiber panel of claim 3, wherein each optical fiber has a triangular cross section.

6. The fiber panel of claim 1, wherein abraded sides of each optical fiber have the same orientation with each other.

7. An automotive light module, comprising:
a light source configured to generate a light; and
a fiber panel optically coupled to the light source, the fiber panel including a plurality of optical fibers wherein each of the optical fibers have at least one noncircular side, and the plurality of optical fibers being arranged such that the at least one noncircular side of each optical fiber have a common orientation with each other to form the fiber panel, each of the optical fibers having a same periodical pattern of abrasions on a side other than the input and output end sides, the fiber panel being configured to output light from at least one emitting side corresponding to abraded sides of the optical fibers, the light source being a light emitting diode, each of the optical fibers being formed by a laser technique, and the periodical pattern being obtained by laser ablation.

8. The light module of claim 7, wherein a cross section of the at least one noncircular side includes a flat section.

9. The light module of claim 8, wherein each optical fiber has a polygonal cross section.

10. The light module of claim 9, wherein each optical fiber has a hexagonal cross section.

11. The light module of claim 9, wherein each optical fiber has a triangular cross section.

12. The light module of claim 7, wherein the plurality of optical fibers are arranged in a honeycomb fashion.

13. The light module of claim 7, wherein abraded sides of each optical fiber have the same orientation with each other.

14. A method for transmitting light using a fiber panel, the method comprising:
arranging a plurality of optical fibers to define an illumination region;
coupling light from a light source to the plurality of optical fibers wherein each of the optical fibers have at least one noncircular side, and the fibers being arranged such that the at least one noncircular side of each optical fiber have a common orientation with each other to form the fiber panel, each of the optical fibers having a same periodical pattern of abrasions on a side other than the input and output end sides, the fiber panel being configured to output light from at least one emitting side corresponding to abraded sides of the optical fibers;
incorporating the method in an automotive light module; and
forming each of the optical fibers by a laser technique, wherein the same periodical pattern of abrasions is obtained by laser ablation.

* * * * *